(12) United States Patent
Liao et al.

(10) Patent No.: US 9,256,091 B2
(45) Date of Patent: Feb. 9, 2016

(54) DISPLAY DEVICE WITH STAND

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Quan Liao, Shenzhen (CN); Chih-Kang Cho, New Taipei (TW); Zhan-Ao Yu, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 97 days.

(21) Appl. No.: 14/267,063

(22) Filed: May 1, 2014

(65) Prior Publication Data
US 2014/0362547 A1    Dec. 11, 2014

(30) Foreign Application Priority Data

Jun. 7, 2013    (CN) ........................ 2013 1 02243639

(51) Int. Cl.
G06F 1/16    (2006.01)
G02F 1/1333    (2006.01)
F16M 11/00    (2006.01)

(52) U.S. Cl.
CPC ......... *G02F 1/133305* (2013.01); *F16M 11/00* (2013.01); *G06F 1/166* (2013.01)

(58) Field of Classification Search
USPC ............ 362/611, 249.01, 382, 615, 488, 464, 362/609, 97.1, 607.41; 361/829, 679.21, 361/679.01, 679.22, 679.07, 679.08, 361/679.09, 679.26, 679.27, 679.05, 361/679.59, 679.47, 679.3; 345/156, 212, 345/2.2, 650, 419, 173, 168, 32, 76, 204, 345/211, 215, 697; 715/762, 863; 455/575.8, 575.5, 575.6, 556.1; 248/346.03, 176.3, 125.1, 161, 917, 248/688, 125.7, 121; 349/58, 12, 42, 61, 349/149, 43, 152
See application file for complete search history.

(56) References Cited

U.S. PATENT DOCUMENTS 6,975,507 B2 *   12/2005   Wang et al. ............... 361/679.21
2003/0222850 A1 *   12/2003   Hung ........................... 345/156
2010/0014272 A1 *   1/2010   Horie ........................... 361/829

* cited by examiner

*Primary Examiner* — Hung Duong
(74) *Attorney, Agent, or Firm* — Novak Druce Connolly Bove + Quigg LLP

(57) ABSTRACT

A display device includes a front side and a rear side. A screen is mounted on the front side. A stand is mounted on the rear side. The stand includes a first supporting piece and a second supporting piece obtusely connected to the first supporting piece. The first supporting piece is pivotably connected to the rear side of the display device. A circuit board is mounted on the first supporting piece of the stand.

20 Claims, 5 Drawing Sheets

DISPLAY DEVICE WITH STAND

CROSS-REFERENCE TO RELATED APPLICATIONS

This application claims all benefits accruing under 35 U.S.C. §119 from Chinese Patent Application No. 201310224363.9, filed on Jun. 7, 2013 in the China Intellectual Property Office. The contents of the Chinese Application are hereby incorporated by reference.

FIELD

The present disclosure relates to a display device, and more particularly to a display device with a variable stand.

BACKGROUND

Since the development of touch screen technology, touch screens are becoming widely used. For example, touch screens are widely equipped to replace traditional display screens.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
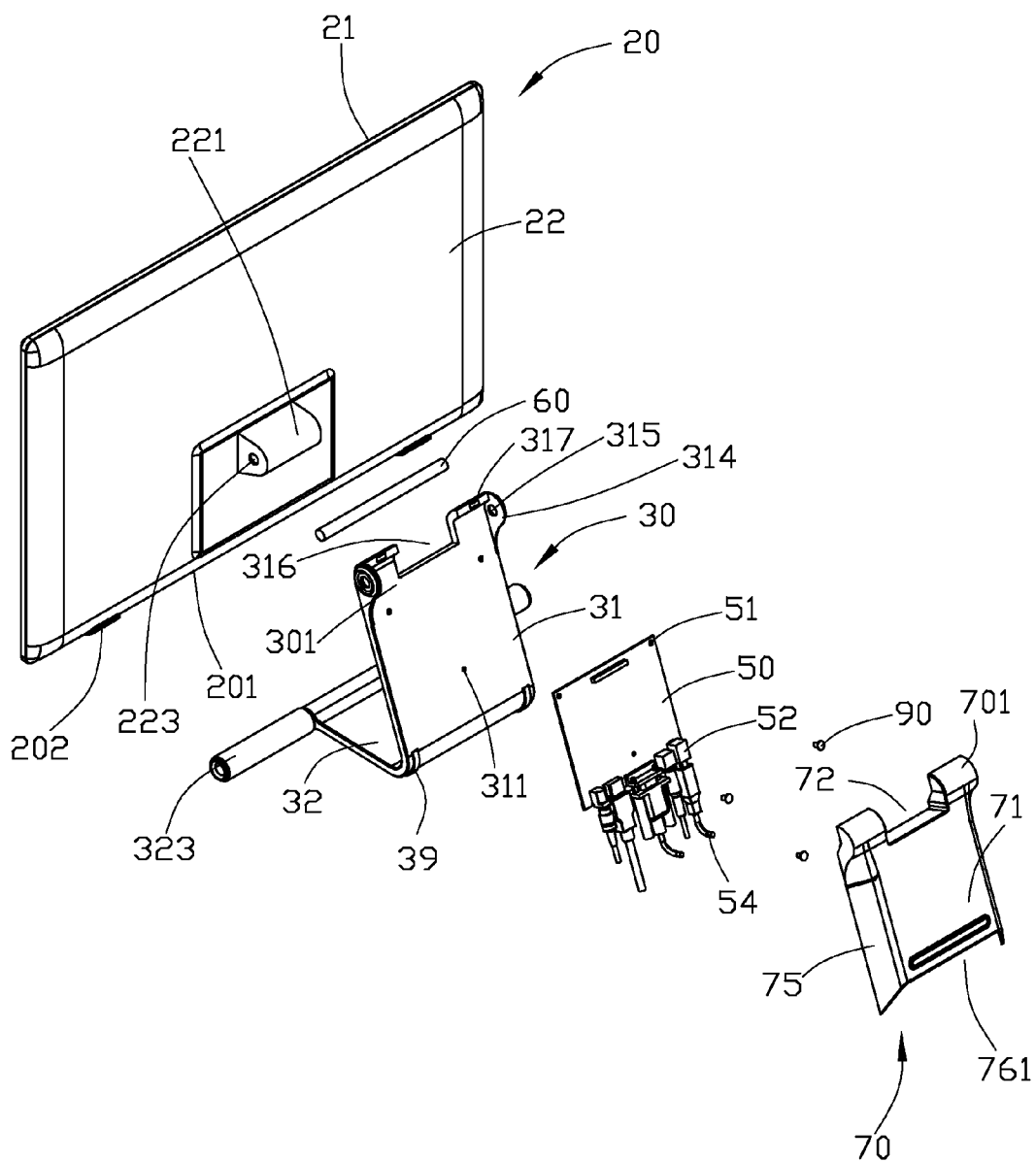
FIG. 1 is an isometric, exploded view of an embodiment of a display device with a stand.
Figure 2:
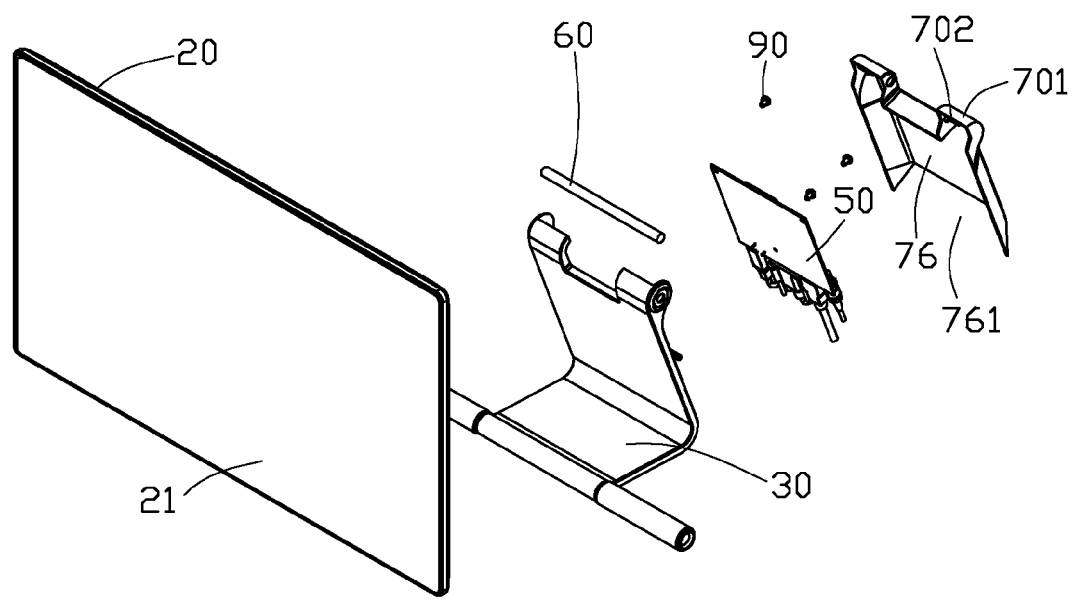
FIG. 2 is similar to FIG. 1, but viewed from another aspect.
Figure 3:
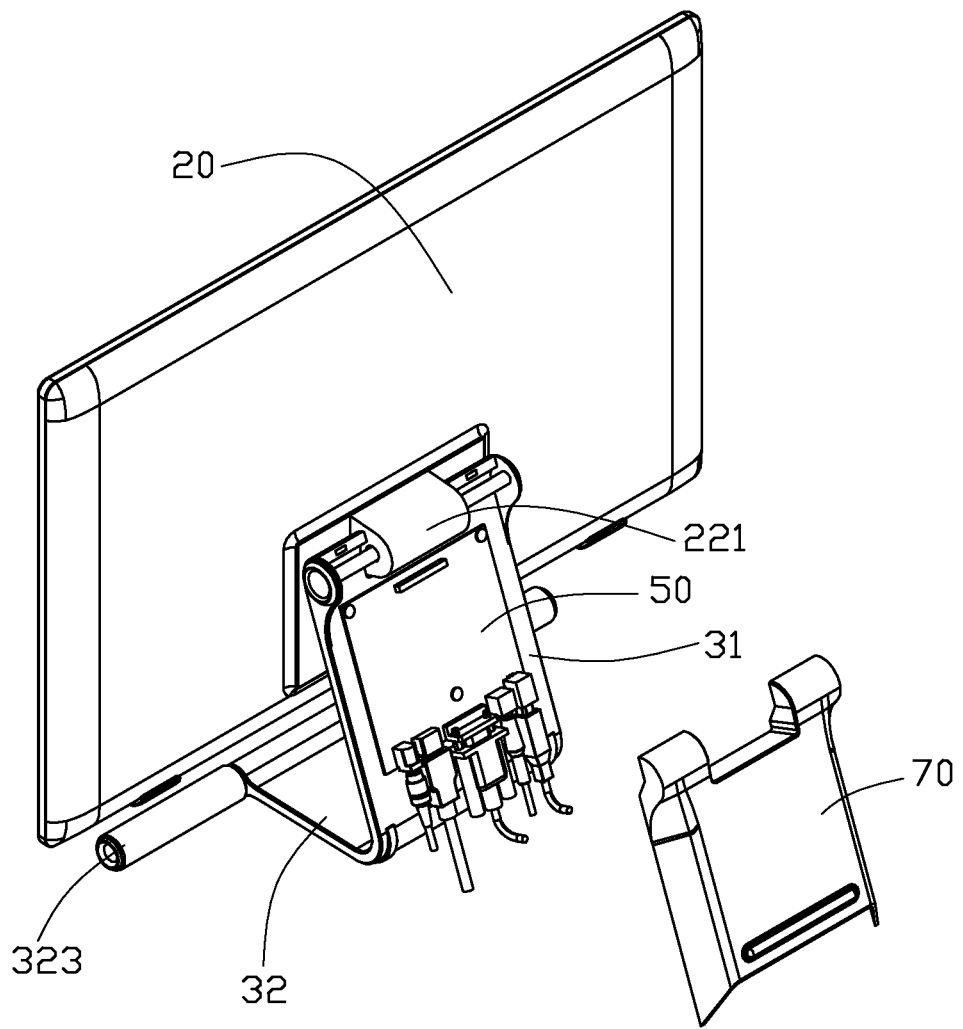
FIG. 3 is a partially assembled view of the display device of FIG. 1.

FIGS. 1 and 2 illustrate one embodiment of a display device 20 with a stand 30. The stand 30 is pivotably mounted to the display device 20 via a shaft 60.

The display device 20 includes a front side 21 and a rear side 22. A touch screen (not labeled) is mounted on the front side 21. A mounting portion 221 protrudes from the rear side 22. A contour of the mounting portion 221 is arced. The mounting portion 221 defines a pivot hole 223. A plurality of skid-proof cushions 202 is mounted on a bottom edge 201 of the display device 20.

The stand 30 includes a first supporting piece 31 and a second supporting piece 32. The first supporting piece 31 and the second supporting piece 32 are connected to each other to form a "V" shape. A plurality of skid-proof pads 39 is mounted on an outer surface of a connection portion of the first supporting piece 31 and the second supporting piece 32.

The first supporting piece 31 includes a free end 301 which is located at a distal end portion of the first supporting piece 31. A first cutout 316 is defined in a substantially central portion of the free end 301. A pair of first clips 317 is located at opposite sides of the cutout 316. The free end 301 includes a pair of ear pieces 314. Each ear piece 314 defines a fixing hole 315. The first supporting piece 31 defines a plurality of securing holes 311.

A pair of skid-proof sleeves 323 is mounted to the second supporting piece 32.

A circuit board 50 can be secured to the first supporting piece 31. The circuit board 50 defines a plurality of through holes 51 corresponding to the plurality of securing holes 311 of the first supporting piece 31. The circuit board 50 includes a plurality of connectors 52 and a plurality of cables 54 connected to the plurality of connectors 52.

A cover 70 is configured to cover the first supporting piece 31. The cover 70 includes a shield plate 71 and a pair of side walls 75 obliquely connected to opposite edges of the shield plate 71. The shield plate 71 and the pair of side walls 75 cooperatively define a receiving space 76. The receiving space 76 includes an opening 761. The shield plate 71 includes two engaging portions 701. Each engaging portion 701 includes a second clip 702. A second cutout 72 is defined between the two engaging portions 701.

Referring to FIGS. 1 to 5, in assembly, the shaft 60 extends through the pivot hole 223 of the display device 20. The mounting portion 221 is received in the first cutout 316. Opposite ends of the shaft 60 extend through the fixing holes 315 of the ear pieces 314 to connect the display device 20 to the stand 30. The stand 30 can rotate about the shaft 60 with respect to the display device 20.

The through holes 51 of the circuit board 50 are aligned to the securing holes 311 of the first supporting piece 31. A plurality of fasteners 90 extend through the through holes 51 and the securing holes 311 to mount the circuit board 50 to the first supporting piece 31. The side walls 75 of the cover 70 are placed on the first supporting piece 31. The mounting portion 221 is further received in the second cutout 72 of the cover 70. The first clips 317 engage the second clips 702 to secure the first supporting piece 31 and the cover 70 together. The circuit board 50 is received in the receiving space 76. The cables 54 extend through the opening 761.

Figure 4:
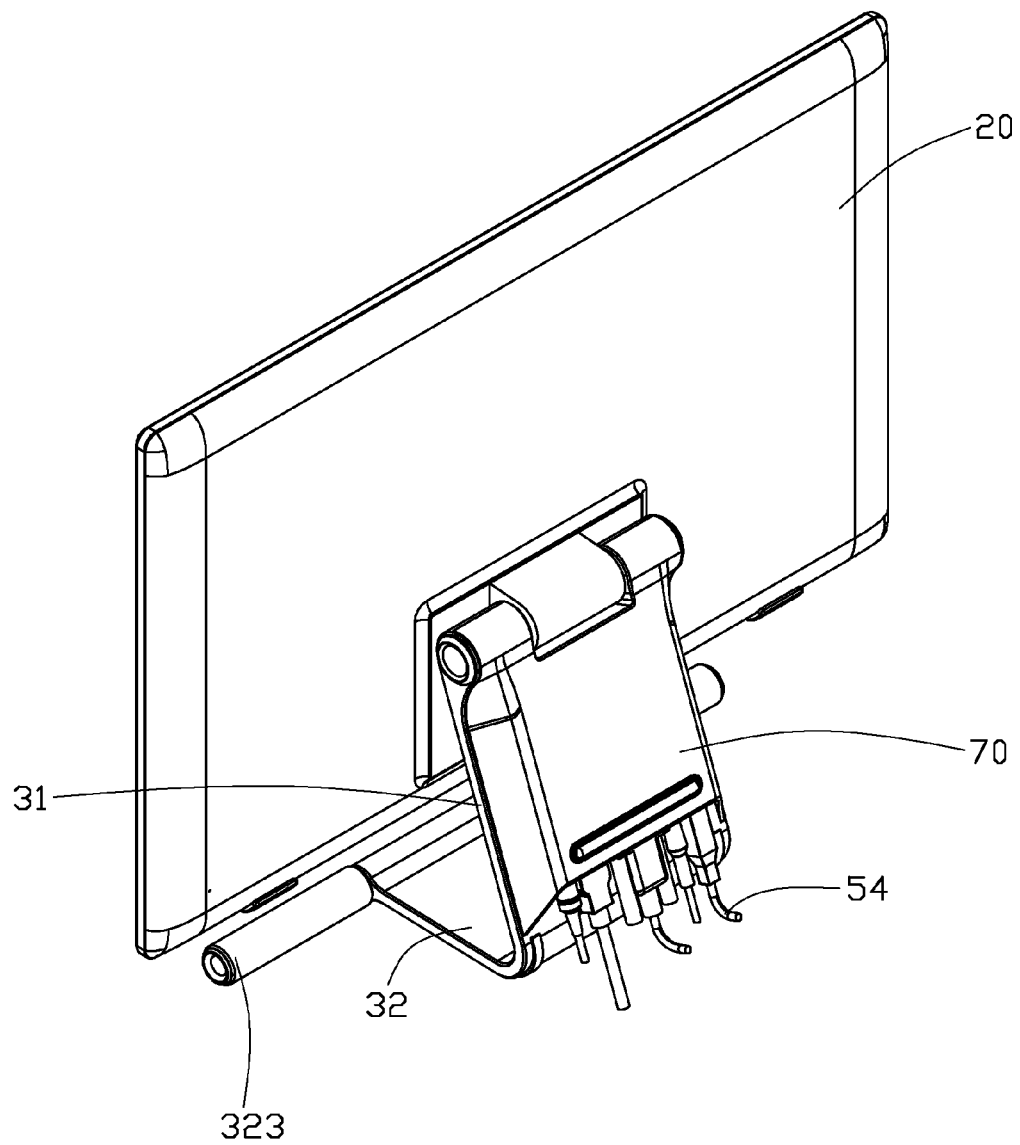
FIG. 4 is an assembled view of the display device of FIG. 1.
Figure 5:
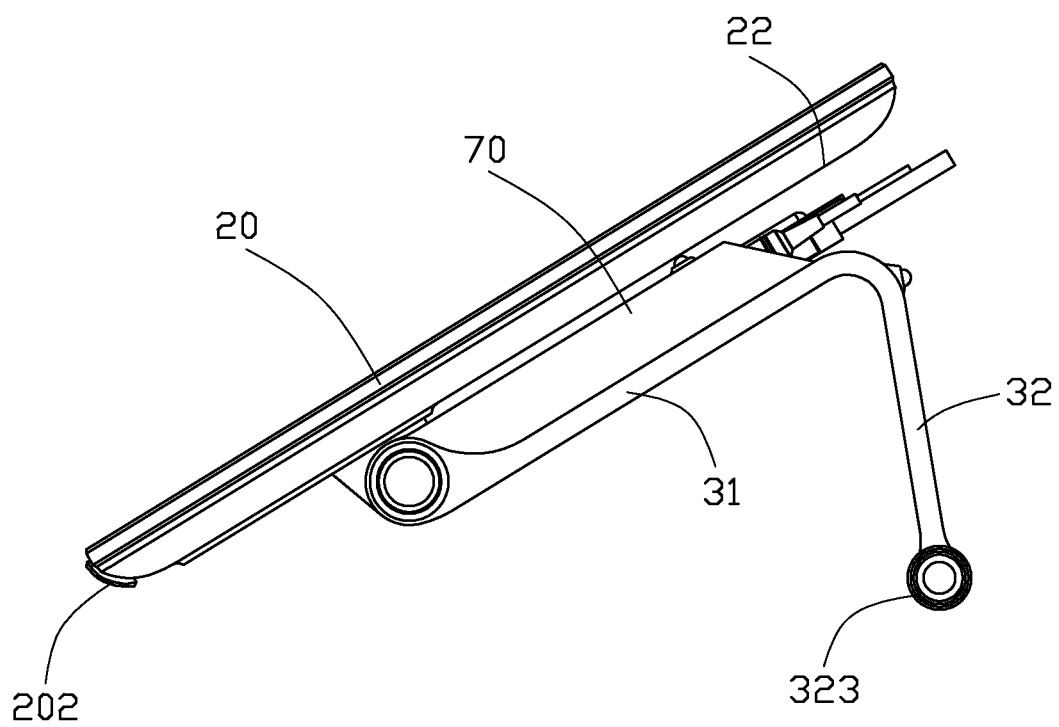
FIG. 5 is a side view of the display device.

The display device 20 can be moved between a first position and a second position. FIG. 4 shows the display device 20 in the first position. In the first position, the second supporting piece 32 is substantially parallel to a work surface (not shown). The display device 20 can rotate around the shaft 60 to adjust an angle of the display device 20. FIG. 5 shows the display device 20 in the second position. In the second position, the stand 30 rotates with respect to the display device 20 to move the first supporting piece 31 substantially parallel to the rear side 22 of the display device 20. The skid-proof sleeves 323 of the stand 30 and the skid-proof cushions 202 are placed on the work surface to support the display device 20 on the work surface at an angle. In the second position, the touch screen on the front side 21 of the display device 20 can be touched without the display device 20 shaking or moving.

It is to be understood, however, that even though numerous characteristics and advantages of the embodiments have been set forth in the foregoing description, together with details of the structure and functions of the embodiments, the disclosure is illustrative only, and changes may be made in detail, especially in the matters of shape, size, and arrangement of parts within the principles of the present disclosure to the full extent indicated by the broad general meaning of the terms in which the appended claims are expressed.

What is claimed is:

1. A display device, comprising:
    a front side with a screen mounted thereon;
    a rear side opposite to the front side;
    a stand mounted on the rear side, the stand comprising a first supporting piece pivotably connected with the rear side and a second supporting piece inclinedly connected to the first supporting piece; and
    a circuit board mounted on the first supporting piece.

2. The display device of claim 1, wherein the first supporting piece defines a plurality of securing holes, the circuit board defines a plurality of through holes, the plurality of through holes are aligned to the plurality of securing holes, and a plurality of fasteners are mounted in the plurality of through holes and the plurality of securing holes to mount the circuit board on the first supporting piece.

3. The display device of claim 1, wherein a cover is mounted on the first supporting piece to shield the circuit board.

4. The display device of claim 3, wherein the cover comprises a shield plate and a pair of side walls inclinedly connected to opposite edges of the shield plate, the shield plate and the pair of side walls together surrounds a receiving space, the pair of side walls is located on the first supporting piece, and the circuit board is received in the receiving space.

5. The display device of claim 4, wherein the receiving space comprises an opening, the circuit board comprises a plurality of connectors, a plurality of cables extends through the opening to connect to the plurality of connectors.

6. The display device of claim 1, wherein a mounting portion is protruded on the rear side, the mounting portion defines a pivot hole, and a shaft is mounted on the first supporting piece and pivotably received in the pivot hole.

7. The display device of claim 6, wherein the first supporting piece defines a first cutout, the mounting portion is received in the first cutout, the first supporting piece comprises a pair of ear pieces, each of the pair of ear pieces defines a fixing hole, and opposite ends of the shaft are inserted in the fixing holes of the pair of ear pieces to fix the shaft on the stand.

8. The display device of claim 7, wherein the first supporting piece comprises two first clips located on opposite sides of the first cutout, a cover comprises two second clips, and the two first clips engage with the second clips.

9. The display device of claim 1, wherein the second supporting piece is mounted with a skid-proof sleeve, and a bottom edge of the display device is mounted with a skid-proof cushion.

10. The display device of claim 1, wherein the screen is a touch screen.

11. A display device, comprising:
    a front side comprising a screen;
    a rear side opposite to the front side, a stand mounted on the rear side, the stand comprising a first supporting piece and a second supporting piece inclinedly connected to the first supporting piece, the first supporting piece pivotably connected with the rear side;
    wherein the stand is configured to support the screen between a first position and a second position; in the first position, the second supporting piece is parallel placed on a work surface, and the rear side is configured to rotate with respect to the first supporting piece; in the second position, the first supporting piece is located on the rear side, an end of the second support piece and an bottom edge of the display device is located on the work surface to support the display device.

12. The display device of claim 11, wherein the end of second supporting piece is mounted with a skid-proof sleeve, and the bottom edge of the display device is mounted with a skid-proof cushion.

13. The display device of claim 11, wherein the screen is a touch screen.

14. The display device of claim 11, wherein a circuit board is mounted on the first supporting piece.

15. The display device of claim 14, wherein a cover is mounted on the first supporting piece to shield the circuit board.

16. The display device of claim 15, wherein the cover comprises a shield plate and a pair of side walls inclinedly connected to opposite edges of the shield plate, the shield plate and the pair of side walls together surrounds a receiving space, the pair of side walls is located on the first supporting piece, and the circuit board is received in the receiving space.

17. The display device of claim 16, wherein the receiving space comprises an opening, the circuit board comprises a plurality of connectors, a plurality of cables extends through the opening to connect to the plurality of connectors.

18. The display device of claim 11, wherein a mounting portion is protruded on the rear side, the mounting portion defines a pivot hole, and a shaft is mounted on the first supporting piece and pivotably mounted in the pivot hole.

19. The display device of claim 18, wherein the first supporting piece defines a first cutout, the mounting portion is received in the first cutout, the first supporting piece comprises a pair of ear pieces, each of the pair of ear pieces defines a fixing hole, and opposite ends of the shaft are inserted in the fixing holes of the pair of ear pieces to fix the shaft on the stand.

20. The display device of claim 19, wherein the first supporting piece comprises two first clips located on opposite sides of the first cutout, a cover comprises two second clips, and the two first clips engage with the second clips.

* * * * *